US011825991B2

(12) United States Patent
Wen

(10) Patent No.: US 11,825,991 B2
(45) Date of Patent: Nov. 28, 2023

(54) BLADE ASSEMBLY AND FOOD PROCESSOR HAVING SAME

(71) Applicants: GUANGDONG MIDEA WHITE HOME APPLIANCE TECHNOLOGY INNOVATION CENTER CO., LTD., Foshan (CN); MIDEA GROUP CO., LTD., Foshan (CN)

(72) Inventor: Zhihua Wen, Foshan (CN)

(*) Notice: Subject to any disclaimer, the term of this patent is extended or adjusted under 35 U.S.C. 154(b) by 325 days.

(21) Appl. No.: 17/284,790

(22) PCT Filed: Dec. 18, 2018

(86) PCT No.: PCT/CN2018/121679
§ 371 (c)(1),
(2) Date: Apr. 13, 2021

(87) PCT Pub. No.: WO2020/077793
PCT Pub. Date: Apr. 23, 2020

(65) Prior Publication Data
US 2022/0000315 A1 Jan. 6, 2022

(30) Foreign Application Priority Data
Oct. 17, 2018 (CN) .......................... 201811208007.7

(51) Int. Cl.
*A47J 43/07* (2006.01)
*A47J 43/046* (2006.01)
*A47J 43/08* (2006.01)

(52) U.S. Cl.
CPC ......... *A47J 43/0722* (2013.01); *A47J 43/046* (2013.01); *A47J 43/085* (2013.01)

(58) Field of Classification Search
CPC ........ A47J 43/046; A47J 43/085; A47J 43/04; A47J 43/08; A47J 43/0722; B01F 27/703;
(Continued)

(56) References Cited

U.S. PATENT DOCUMENTS 2,807,447 A * 9/1957 Vaughan ............... A47J 43/046
366/314
9,149,156 B2 * 10/2015 Rosenzweig ........... B01F 35/30
(Continued)

FOREIGN PATENT DOCUMENTS

CN S62101447 U 6/1987
CN 201404117 Y 2/2010
(Continued)

OTHER PUBLICATIONS

Search Report for EP application 18936966.3.
OA for JP application 2021-520153 dated Apr. 19, 2022.
First OA for CN application 201811208007.7.

*Primary Examiner* — Marc C Howell
*Assistant Examiner* — Patrick M McCarty
(74) *Attorney, Agent, or Firm* — KILPATRICK TOWNSEND & STOCKTON, LLP

(57) ABSTRACT

A blade assembly and a food processor having the same are provided. The blade assembly includes an inner blade shaft, an outer blade shaft, an inner joint assembly, and an outer joint assembly. The outer blade shaft is fitted over the inner blade shaft. The inner joint assembly includes an inner blade joint, an inner motor joint, and an inner sealing head. The inner sealing head is connected between the inner blade joint and the inner motor joint, the inner blade joint is connected to the inner blade shaft. The outer joint assembly includes an outer blade joint, an outer motor joint, and an outer sealing head, the outer sealing head is connected between the outer blade joint and the outer motor joint, and the outer blade joint is connected to the outer blade shaft.

18 Claims, 5 Drawing Sheets

(58) Field of Classification Search
CPC .... B01F 27/704; B01F 27/705; B01F 27/706; B01F 27/708; B01F 35/31
See application file for complete search history.

(56) References Cited

U.S. PATENT DOCUMENTS

| | | | | |
|---|---|---|---|---|
| 10,874,257 | B2* | 12/2020 | Ouyang | A47J 43/046 |
| 2006/0208119 | A1* | 9/2006 | Mally | F16D 3/68 |
| | | | | 241/282.2 |
| 2015/0036459 | A1* | 2/2015 | Holm | A47J 43/046 |
| | | | | 366/205 |
| 2017/0354940 | A1 | 12/2017 | Kolar et al. | |
| 2018/0042427 | A1* | 2/2018 | Boozer | A47J 43/085 |

FOREIGN PATENT DOCUMENTS

| | | |
|---|---|---|
| CN | 101940441 A | 1/2011 |
| CN | 205514147 U | 8/2016 |
| CN | 205649410 U | 10/2016 |
| CN | 206151299 U | 5/2017 |
| CN | 206324693 U | 7/2017 |
| CN | 206354935 U | 7/2017 |
| CN | 206507828 U | 9/2017 |
| CN | 107296525 A | 10/2017 |
| CN | 107319963 A | 11/2017 |
| JP | S4872034 U | 9/1973 |
| JP | H01189424 A | 7/1989 |
| JP | 2006102083 A | 4/2006 |
| JP | 2017032393 A | 2/2017 |

* cited by examiner

BLADE ASSEMBLY AND FOOD PROCESSOR HAVING SAME

CROSS-REFERENCES TO RELATED APPLICATIONS

The present disclosure is a national phase application of International Application No. PCT/CN2018/121679, filed on Dec. 18, 2018, which claims priority to and benefits of Chinese Patent Application Serial No. 201811208007.7, filed with the National Intellectual Property Administration of PRC on Oct. 17, 2018, the entire content of which is incorporated herein by reference.

FIELD

The present disclosure relates to a field of food processors, and more particularly to a blade assembly and a food processor having the same.

BACKGROUND

A food processor in the related art has a poor sealing effect at connection between a blade shaft and a motor shaft, and it is easy for liquid in the blade shaft to enter an interior of the motor and cause the motor to malfunction.

SUMMARY

The present disclosure aims to solve at least one of the problems in the related art. For this, the present disclosure proposes a blade assembly, and a sealing effect of connection between a blade assembly and a motor shaft is better.

The present disclosure further aims to propose a food processor having the blade assembly.

The blade assembly according to embodiments of the present disclosure, including: an inner blade shaft; an outer blade shaft fitted over the inner blade shaft; an inner joint assembly including an inner blade joint, an inner motor joint, and an inner sealing head, the inner sealing head being connected between the inner blade joint and the inner motor joint, the inner blade joint being connected to the inner blade shaft, and the inner motor joint being adapted to be connected to a motor inner shaft; an outer joint assembly including an outer blade joint, an outer motor joint, and an outer sealing head, the outer sealing head being connected between the outer blade joint and the outer motor joint, the outer blade joint being connected to the outer blade shaft, and the outer motor joint being adapted to be connected to a motor outer shaft. The inner blade joint is located at an inner side of the outer blade joint, the inner motor joint is located at an inner side of the outer motor joint, an end face of the inner sealing head and an end face of the outer sealing head are staggered along an axial direction, and the inner sealing head is arranged adjacent to the inner blade shaft.

In the blade assembly according to the embodiments of the present disclosure, since the inner joint assembly is arranged between the inner blade shaft and the motor inner shaft, and the outer blade assembly is arranged between the outer blade shaft and the motor outer shaft, the sealing between the blade assembly and the motor can be better ensured, and the phenomenon of water entering the motor can be prevented.

According to an embodiment of the present disclosure, the inner sealing head is fitted over the inner motor joint, an end of the inner sealing head toward the inner blade shaft is a closed end, and an end of the inner blade joint is fitted over the inner sealing head.

According to an embodiment of the present disclosure, an outer circumferential surface of the inner motor joint is provided with an inner circumferential boss, and an open end of the inner sealing head is formed with an inner wrapping protrusion wrapped on the inner circumferential boss; the outer sealing head is fitted on an end face of the outer motor joint and has a central hole, the outer sealing head is provided with a first projecting ring extending toward the inner blade shaft along the central hole, and an outer circumferential surface of the first projecting ring is located at an inner side of the inner wrapping protrusion.

According to a yet another embodiment of the present disclosure, an outer circumferential edge of the outer sealing head is provided with a second projecting ring extending in a direction away from the inner blade shaft.

According to an embodiment of the present disclosure, an outer circumference of the inner motor joint is provided with first anti-rotation ribs distributed along the circumferential direction, the inner sealing head is provided with first protective sleeves respectively fitted over the plurality of first anti-rotation ribs, and an inner circumference of the inner blade joint is provided with first anti-rotation grooves into which the plurality of first protective sleeves are respectively inserted.

According to an embodiment of the present disclosure, a mating surface between each first anti-rotation rib and a corresponding first anti-rotation groove is a guiding surface, and the guiding surface extends obliquely toward a rotation axis of the inner blade shaft in a direction toward the inner blade shaft.

According to an embodiment of the present disclosure, an outer circumference of the outer motor joint is provided with second anti-rotation ribs distributed along the circumferential direction, the outer sealing head is provided with second protective sleeves respectively fitted over the plurality of second anti-rotation ribs, and an inner circumference of the outer blade joint is provided with second anti-rotation grooves into which the plurality of second protective sleeves are respectively inserted.

According to an embodiment of the present disclosure, the outer motor joint has an outer central hole, the inner motor joint is inserted into the outer central hole, and a radial gap between the outer motor joint and the inner motor joint is a, a satisfies a≥1 mm.

According to an embodiment of the present disclosure, an assembling clearance between the inner blade joint and the inner sealing head is less than 0.3 mm, and an assembling clearance between the outer blade joint and the outer sealing head is less than 0.3 mm.

The food processor according to embodiments of the present disclosure includes the blade assembly.

In the food processor according to the embodiments of the present disclosure, since the blade assembly described above is included, the sealing between the blade assembly and the motor can be better ensured, the possibility of water entering the motor can be reduced, the failure rate of the machine can be reduced, and the user satisfaction can be increased.

Additional embodiments of the present disclosure will be presented in part in the following description, become apparent in part from the following description, or be learned from the practice of the present disclosure.

BRIEF DESCRIPTION OF THE DRAWINGS

The above and/or additional embodiments of the present disclosure will become apparent and more readily appreciated from the following description of embodiments with reference to the drawings, in which.

Figure 1:
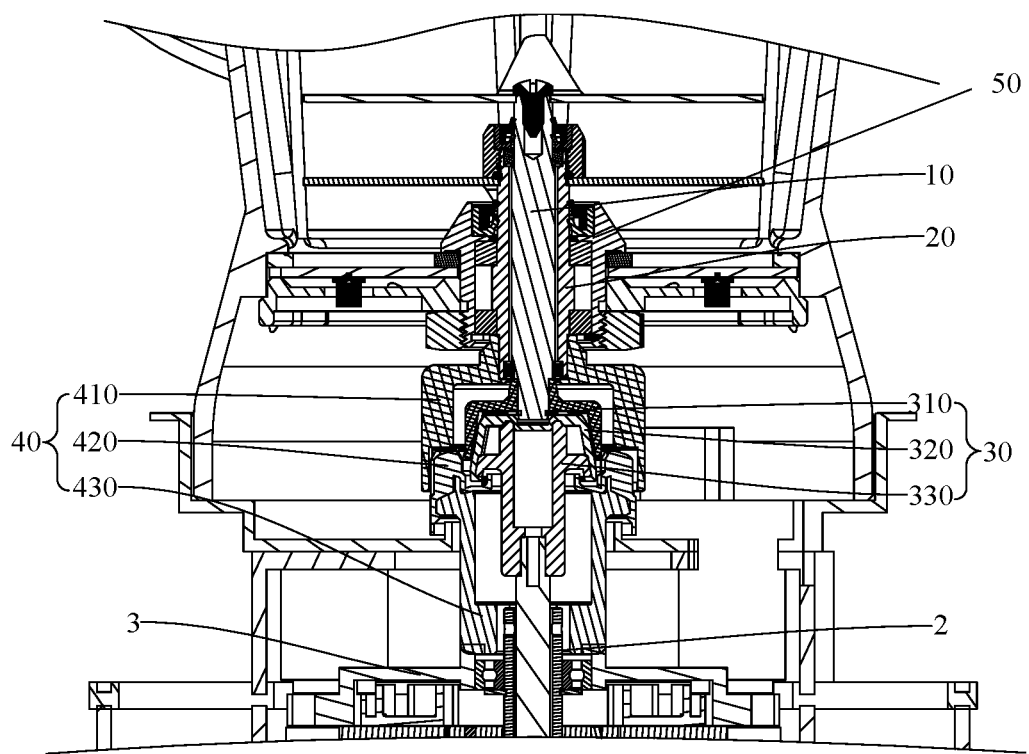
FIG. 1 is a partial structural view of a blade assembly mounted in a food processor according to an embodiment of the present disclosure.

REFERENCE NUMERALS blade assembly 1
inner blade shaft 10, inner blade 10*a*
outer blade shaft 20, outer blade 20*a*, mounting groove 210, positioning boss 220
inner joint assembly 30
inner blade joint 310, first anti-rotation groove 311
inner sealing head 320, inner wrapping protrusion 321, first protective sleeve 322, plug 323
inner motor joint 330, inner circumferential boss 331, first anti-rotation rib 332, inner central hole 333
outer joint assembly 40
outer blade joint 410, second anti-rotation groove 411
outer sealing head 420, first projecting ring 421, second projecting ring 422, second protective sleeve 423, central hole 424
outer motor joint 430, second anti-rotation rib 431, outer central hole 432
blade sleeve 50
lock nut 60*a*
outer bearing 70*a*, inner bearing 70*b*
blade shaft nut 80*a*, screw 80*b*, set screw 80*c*, retaining ring 80*d*
first oil seal 90*a*, second oil seal 90*b*
first plane S1, second plane S2, guiding surface S3
motor inner shaft 2, motor outer shaft 3.

DETAILED DESCRIPTION OF THE DISCLOSURE

Embodiments of the present disclosure will be described in detail below, and the examples of the embodiments will be illustrated in the drawings. The same or similar elements and the elements having same or similar functions are denoted by like reference numerals throughout the description. The embodiments described herein with reference to the drawings are illustrative and used to generally understand the present disclosure. The embodiments shall not be constructed to limit the present disclosure.

In the description of the present disclosure, relative terms such as "central," "longitudinal," "lateral," "length," "width," "thickness," "upper," "lower," "front," "rear," "left," "right," "vertical," "horizontal," "top," "bottom," "inner," "outer," "clockwise," "counter-clockwise," "axial," "radial," "circumferential" and the like should be constructed to refer to the orientation or position as then described or as shown in the drawings under discussion. These relative terms are for convenience and simplification of description and do not indicate or imply that the device or element referred to must have a particular orientation, or be constructed and operated in a particular orientation, so these terms shall not be construed to limit the present disclosure. Otherwise, the features defined with "first" and "second" may explicitly or implicitly include one or more of these features. In the descriptions, unless specified or limited otherwise, "a plurality of" means two or more than two.

In the descriptions, unless specified or limited otherwise, the terms "mounted," "connected," "coupled," and variations thereof should be understood broadly. For example, these may be permanent connections, detachable connections or integrated connections; mechanical connections, electrical connections; direct connections or indirect connections through intermediaries; intercommunication or interaction relationships of two elements.

A particular structure of a blade assembly 1 according to embodiments of the present disclosure will be described below with reference to FIGS. 1 to 10.

Figure 2:
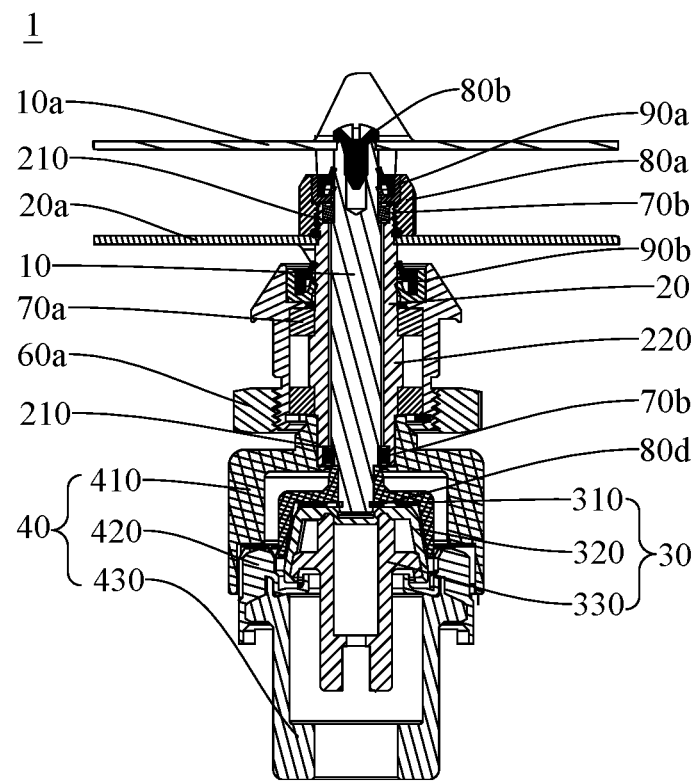
FIG. 2 is a schematic view of a structure of a blade assembly according to an embodiment of the present disclosure.

As illustrated in FIGS. 1 to 2, the blade assembly 1 according to the embodiments of the present disclosure includes an inner blade shaft 10, an outer blade shaft 20, an inner joint assembly 30, and an outer joint assembly 40. The outer blade shaft 20 is fitted over the inner blade shaft 10, the inner joint assembly 30 includes an inner blade joint 310, an inner motor joint 330, and an inner sealing joint 320. The inner sealing joint 320 is connected between the inner blade joint 310 and the inner motor joint 330, and the inner blade joint 310 is connected to the inner blade shaft 10, and the inner motor joint 330 is adapted to be connected to a motor inner shaft 2; and the outer blade joint 40 includes an outer blade joint 410, an outer motor joint 430, and an outer sealing head 420, the outer sealing head 420 is connected between the outer blade joint 410 and the outer motor joint 430, and the outer blade joint 410 is connected to the outer blade shaft 20, the outer motor joint 430 is adapted to be connected to a motor outer shaft 3. The inner blade joint 310 is located at an inner side of the outer blade joint 410, and the inner motor joint 330 is located at an inner side of the outer motor joint 430, an end face of the inner sealing head 320 is staggered with an end face of the outer sealing head 420 along an axial direction, and the inner sealing head 320 is arranged adjacent to the inner blade shaft 10.

It should be understood that the inner blade shaft 10 is connected through the inner blade joint 310, the inner motor joint 330, and the inner sealing head 320, and the inner sealing head 320 is connected between the inner blade joint 310 and the inner motor joint 330. The outer blade shaft 20 is connected through the outer blade joint 410, the outer motor joint 430, and the outer sealing head 420, and the outer sealing head 420 is connected between the outer blade joint 410 and the outer motor joint 430. That is, a junction between the inner blade shaft 10 and the motor inner shaft 2 includes sequentially the inner blade joint 310, the inner sealing head 320, and the inner motor joint 330 from outside to inside in a radial direction. A junction between the outer blade shaft 20 and the motor outer shaft 3 includes sequentially the inner blade joint 310, the inner sealing head 320, and the inner motor joint 330 from outside to inside in the radial direction. Furthermore, the end face of the inner sealing head 320 is staggered with the end face of the outer sealing head 420, and the inner sealing head 320 is arranged adjacent to the inner blade shaft 10, that is, when the blade assembly 1 is arranged in a vertical direction, the end face of the inner sealing head 320 is located above the end face of the outer sealing head 420, and defining a step between the inner sealing head 320 and the outer sealing head 420. Such a stacked step structure can better ensure that liquid entering a junction between the blade assembly 1 and the motor is always guided to the outside of the inner sealing head 320 or the outer sealing head 420, preventing the liquid from entering between the inner sealing head 320 and the inner motor joint 330 or between the outer sealing head 420 and the outer motor joint 430. Therefore, the sealing between the inner blade shaft 10 and the motor inner shaft 2, and between the outer blade shaft 20 and the motor outer shaft 3 can be ensured, a phenomenon of water entering the motor can be prevented, the failure rate of the blade assembly 1 can be reduced, and the user satisfaction can be increased.

In the blade assembly 1 according to the embodiments of the present disclosure, the inner joint assembly 30 is arranged between the inner blade shaft 10 and the motor inner shaft 2, and the outer blade joint 40 is arranged between the outer blade shaft 20 and the motor outer shaft, the sealing between the blade assembly 1 and the motor can be ensured better, and the phenomenon of water entering the motor can be prevented.

Figure 6:
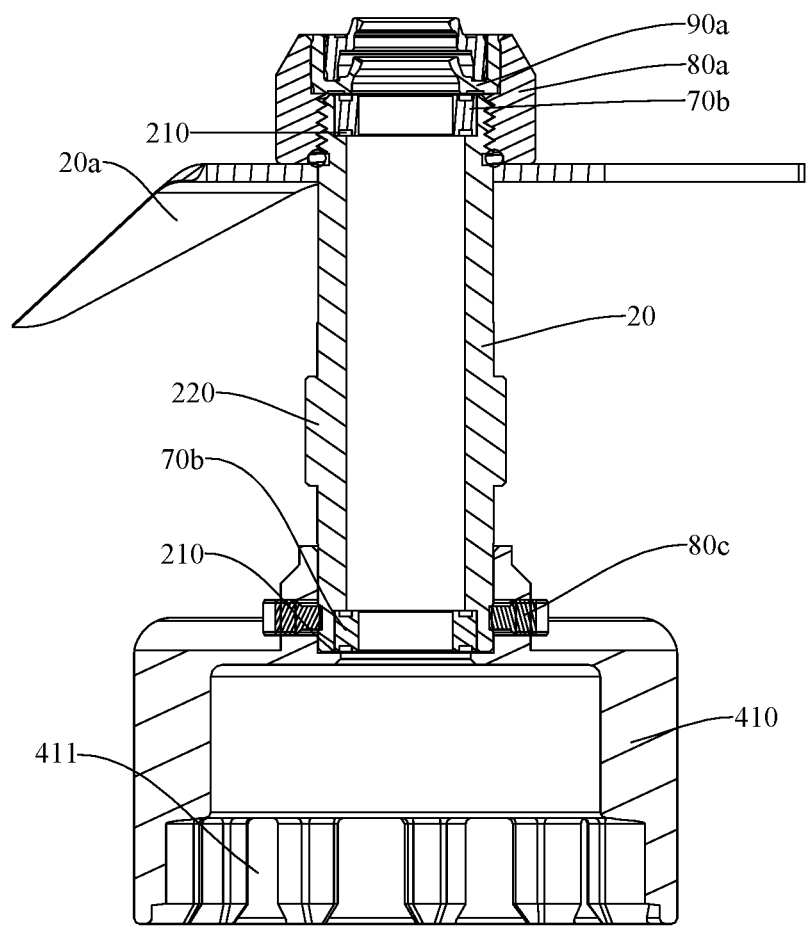
FIG. 6 is an assembled view of an outer blade shaft and an outer blade joint according to an embodiment of the present disclosure.
Figure 7:
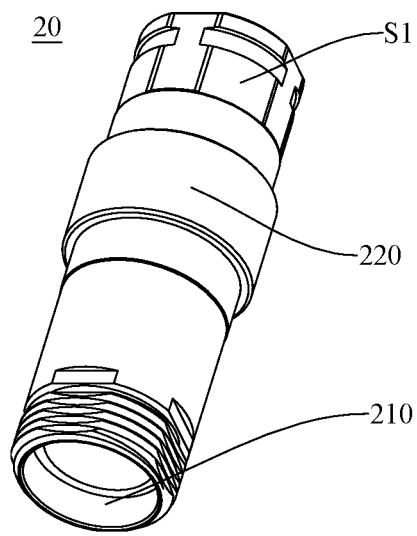
FIG. 7 is a schematic view of a structure of an outer blade shaft according to an embodiment of the present disclosure.
Figure 8:
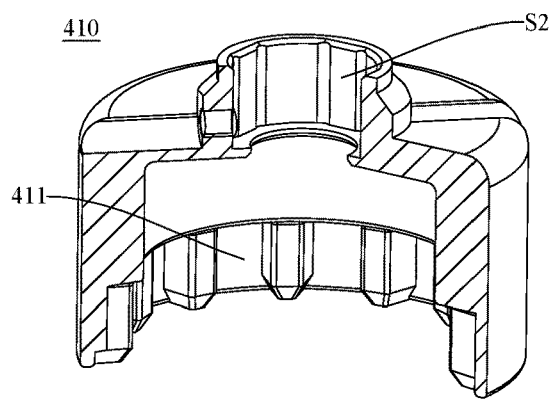
FIG. 8 is a schematic view of a structure of an outer blade joint according to an embodiment of the present disclosure.
Figure 9:
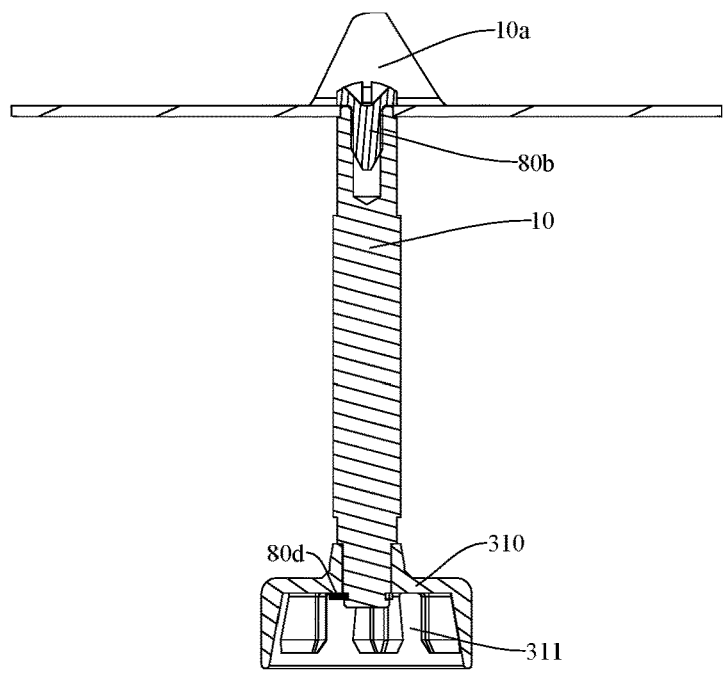
FIG. 9 is a schematic view of a structure of an inner blade shaft according to an embodiment of the present disclosure.
Figure 10:
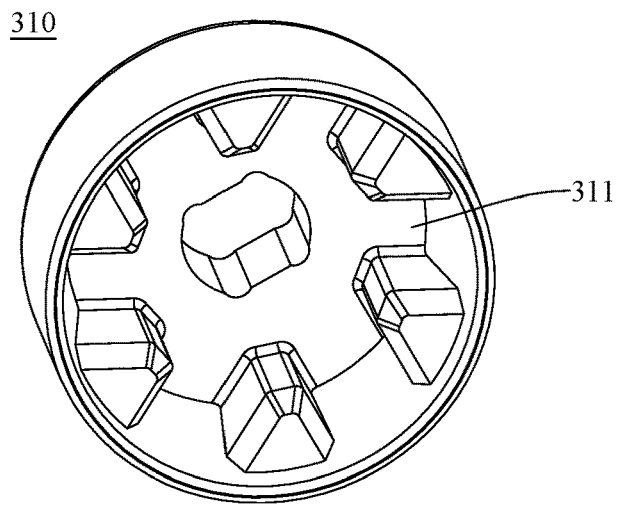
FIG. 10 is a schematic view of a structure of an inner blade joint according to an embodiment of the present disclosure.

It should additionally be mentioned that there are various connection types between the outer blade joint 410 and the outer blade shaft 20. For example, in some embodiments, the outer blade joint 410 and the outer blade shaft 20 are connected by screws, and in this case the outer blade shaft 20 can rotate in one direction only. In other embodiments, the outer blade shaft 20 and the outer blade joint 410 are connected by planar connection cooperating with set screws. As illustrated in FIGS. 6 to 8, an outer circumferential surface of the outer blade shaft 20 is provided with first planes S1 spaced apart in its circumferential direction, and an inner circumferential surface of the outer blade joint 410 is provided with second planes S2 corresponding one-to-one to the plurality of first planes S1. When the outer blade shaft 20 is connected to the outer blade joint 410, the first plane S1 coincides with the second plane S2, and then the outer blade shaft 20 and the outer blade joint 410 are connected by using set screws 80c, and bi-directional rotation of the outer blade shaft 20 driven by the motor outer shaft 3 can be realized. Of course, there are various connection types between the inner blade shaft 10 and the inner blade joint 310, while such connection types are similar to the connection types between the outer blade shaft 20 and the outer blade joint 410, and thus will not be elaborated herein.

Figure 3:
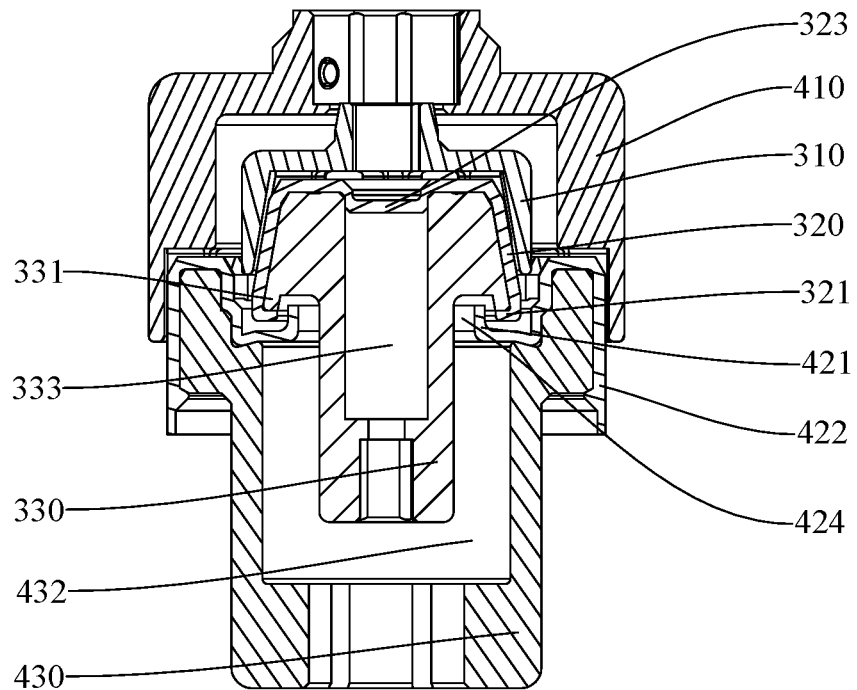
FIG. 3 is a partial structural view of an inner joint assembly and an outer joint assembly according to an embodiment of the present disclosure.
Figure 4:
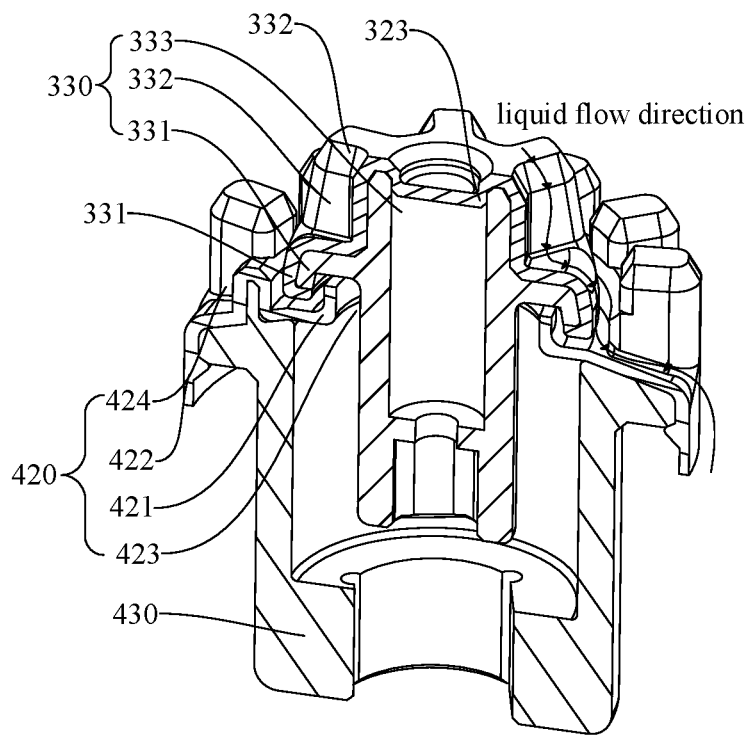
FIG. 4 is a schematic view of liquid flow direction of an inner sealing head and an outer sealing head according to an embodiment of the present disclosure.

In some embodiments, as illustrated in FIGS. 3 and 4, the outer circumferential surface of the inner sealing head 320 is located at the inner side of outer circumferential surface of the outer sealing head 420. Therefore, the liquid that flows through the inner sealing head 320 can flow to the outer side of the inner sealing head 320 along the step defined by the inner sealing head 320 and the outer sealing head 420, possibility of the liquid entering the inner motor joint 330 can be decreased, and the risk of the liquid entering the motor inner shaft 2 can be decreased.

In some embodiments, as illustrated in FIGS. 3 and 4, the outer circumferential surface of the inner blade joint 310 is located at the inner side of the outer circumferential surface of the outer sealing head 420, therefore, the liquid that flows through the inner blade joint 310 can flow to the outer side of the inner blade joint along the step defined by the inner sealing head 320 and the outer sealing head 420, possibility of the liquid entering the inner motor joint 330 can be decreased, and the risk of the liquid entering the motor inner shaft 2 can be decreased.

In some embodiments, as illustrated in FIGS. 2 to 4, the inner sealing head 320 is fitted over the inner motor joint 330, an end of the inner sealing head 320 that faces the inner blade shaft 10 is a closed end, and an end of the inner blade joint 310 is fitted over the inner sealing head 320. It should be understood that the outer blade shaft 20 is fitted over the inner blade shaft 10, in the working process of the blade assembly 1, it is thus possible for liquid to enter the gap between the inner blade shaft 10 and the inner blade joint 310 from the radial gap between the inner blade shaft 10 and the outer blade shaft 20; and the end of the inner sealing head 320 that faces the inner blade shaft 10 as the closed end can prevent liquid from entering the inner motor joint 330, and avoiding the phenomenon of water entering the motor. It should be noted that the closed end of the inner sealing head 320 may be a connecting tube with a closed end formed by the inner sealing head, or it may be formed by a sealing joint at an end of the inner sealing head 320.

In some embodiments, as illustrated in FIGS. 2 to 4, the outer circumferential surface of the inner motor joint 330 is provided with an inner circumferential boss 331, and an open end of the inner sealing head 320 is formed with an inner wrapping protrusion 321 that is wrapped on the inner circumferential boss 331. The outer sealing head 420 is fitted on the end face of the outer motor joint 430 and has a central hole 424, a first projecting ring 421 that extends toward the inner blade shaft 10 is provided on the outer sealing head 420 along the central hole 424, and an outer circumferential surface of the first projecting ring 421 is located at the inner side of the inner wrapping protrusion 321. It should be understood that the outer circumferential surface of the inner motor joint 330 is provided with the inner circumferential boss 331, and the open end of the inner sealing head 320 is formed with the inner wrapping protrusion 321 that is wrapped on the inner circumferential boss. That is, there is a gap between an outer circumferential wall of the inner motor joint 330 located below the inner circumferential boss and an outer circumferential wall of the inner sealing head 320, therefore the liquid flowing into the sealing end of the inner sealing head 320 can only flow along the outer surface of the inner wrapping protrusion 321, and cannot enter the inner motor joint 330 through the gap between the inner sealing head 320 and the inner motor joint 330, therefore, the phenomenon of liquid flowing into the interior of the inner motor joint 330 can be better avoided, and the phenomenon of water entering the motor can be better avoided.

In some embodiments, as illustrated in FIGS. 2 to 4, an upper end face of the first projecting ring 421 is located at an upper end of a lower end face of the inner wrapping protrusion 321. Therefore, a labyrinth seal is formed between the outer circumferential surface of the inner sealing head 320, the lower end face of the inner wrapping protrusion 321, the upper end face of the first projecting ring 421, and the inner circumferential surface of the first projecting ring 421, and reducing the possibility of liquid that flows between the inner sealing head 320 and the outer sealing head 420 entering the center of the outer sealing head 420, and avoiding the phenomenon of liquid entering the interior of the outer motor joint 430.

In some more embodiments, as illustrated in FIGS. 2 to 4, the outer circumferential edge of the outer sealing head 420 is provided with a second projecting ring 422 extending in a direction away from the inner blade shaft 10. Therefore, the liquid can flow in an axial direction of the outer sealing head 420 along the second projecting ring 422, and avoiding the liquid flowing into the outer motor joint 430 from the junction between the outer sealing head 420 and the outer motor joint 430, and preventing the phenomenon of water entering the motor.

Figure 5:
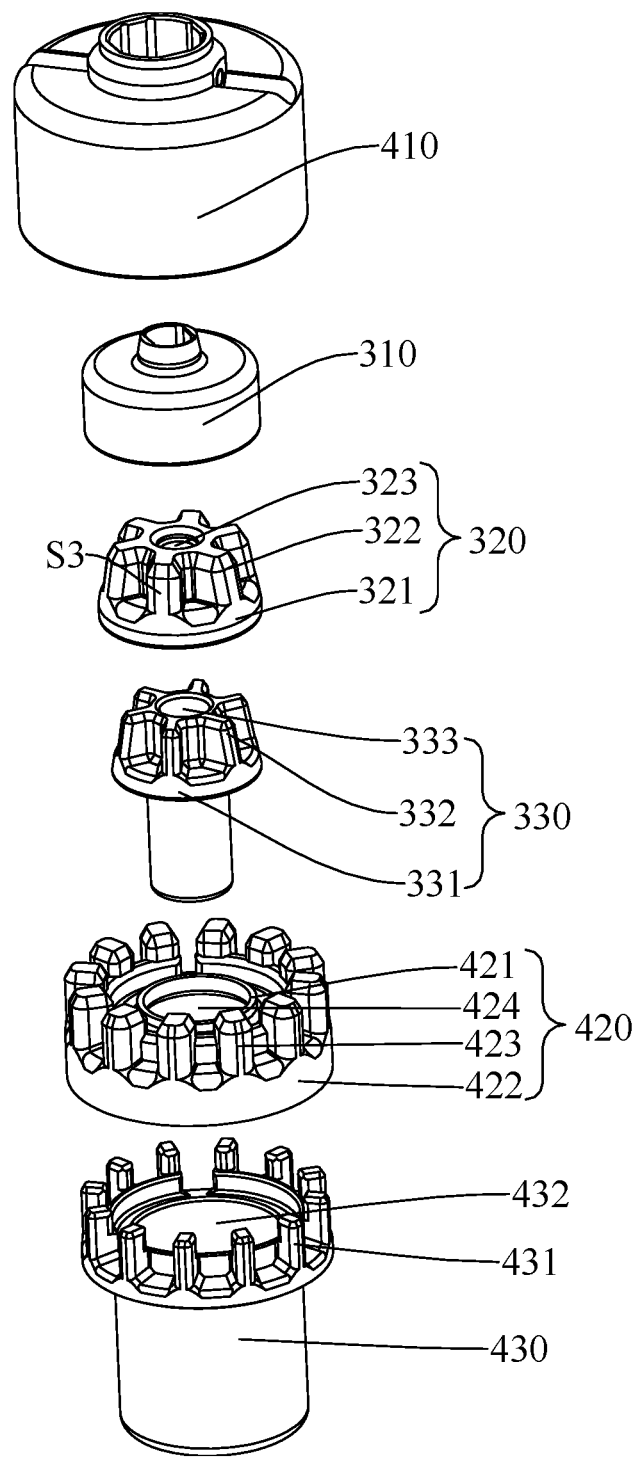
FIG. 5 is an exploded view of an inner joint assembly and an outer joint assembly according to an embodiment of the present disclosure.

In some embodiments, as illustrated in FIGS. 4 to 5, the outer circumference of the inner motor joint 330 is provided with first anti-rotation ribs 332 distributed along the circumferential direction, the inner sealing head 320 is provided with first protective sleeves 322 respectively fitted over the plurality of first anti-rotation ribs 332, and the inner circumference of the inner blade joint 310 is provided with first anti-rotation grooves into which the plurality of first protective sleeves 322 are respectively inserted. It should be understood that when the motor inner shaft 2 rotates, the rotation of the motor inner shaft 2 is transferred to the inner blade shaft 10 through the inner motor joint 330, the inner sealing head 320, and the inner blade joint 310, and driving the inner blade shaft 10 to rotate. However, in the working process, the relative rotation between the inner motor joint 330, the inner sealing head 320, and the inner blade joint 310 needs to be prevented, the phenomenon that the inner blade shaft 10 cannot rotate stably can and be prevented. In the embodiments of the present disclosure, the inner motor joint 330 is provided with the first anti-rotation rib 332, the inner sealing head 320 is provided with the first protective sleeve 322 fitted with the first anti-rotation rib 332, the inner circumference of the inner blade joint 310 is provided with the first anti-rotation groove 311 fitted with the first protective sleeve 322, therefore, the connection between the motor inner shaft 2 and the inner blade shaft 10 can be better realized through cooperation between the first anti-rotation rib 332, the first protective sleeve 322, and the first anti-rotation groove 311, and the phenomenon that the inner blade shaft 10 cannot rotate stably can be prevented.

It should additionally be noted that the predominant effect of the first anti-rotation rib 332, the first protective sleeve 322, and the first anti-rotation groove 311 is the prevention of relative selection between the inner motor joint 330, the inner sealing head 320, and the inner blade joint 310. The specific shape, size, number of the first anti-rotation rib 332, the first protective sleeve 322, and the first anti-rotation groove 311 are not particularly limited herein, that is, the shape, size, and number of the first anti-rotation rib 332, the first protective sleeve 322, and the first anti-rotation groove 311 can be selected according to actual conditions.

In some embodiments, as illustrated in FIG. 4, a mating surface between each first anti-rotation rib 332 and a corresponding first anti-rotation groove is a guiding surface S3, and the guiding surface S3 extends obliquely toward a rotation axis of the inner blade shaft 10 in a direction toward the inner blade shaft 10. It should be understood that the mating surface between each first anti-rotation rib 332 and the corresponding first anti-rotation groove is a guiding surface S3, and the guiding surface S3 extends obliquely toward a rotation axis of the inner blade shaft 10 in a direction toward the inner blade shaft 10, that is, both the inner motor joint 330 and the inner sealing sleeve are formed as tapered shafts toward the inner blade shaft 10, and the first anti-rotation groove 311 on the inner blade joint 310 is formed as a tapered groove in the direction away from the motor inner shaft 2, assembly and disassembly between the inner motor joint 330 and the inner sealing sleeve, the inner sealing sleeve and the inner blade joint 310 can be implemented conveniently through such a shape, and coaxality of the inner blade shaft 10 and the motor inner shaft 2 can be ensured to some extent.

In some embodiment, an inclination angle of the guiding surface S3 is equal to 10°.

In some embodiments, as illustrated in FIGS. 4 to 5, the inner motor joint 330 has an inner central hole 333, and the end face of the inner sealing head 320 toward the inner motor joint 330 is provided with a plug 323 that can be inserted into the inner central hole 333, therefore, the coaxality of the inner motor joint 330 and the inner sealing head 320 can be better ensured, and the stable rotation of the inner blade shaft 10 can be achieved.

In some embodiments, as illustrated in FIGS. 4 to 5, the outer circumference of the outer motor joint 430 is provided with the plurality of second anti-rotation ribs 431 distributed along the circumferential direction, the outer sealing head 420 is provided with second protective sleeves 423 fitted respectively over the plurality of second anti-rotation ribs 431, and the inner circumference of the outer blade joint 410 is provided with the plurality of second anti-rotation grooves into which the plurality of second protective sleeves 423 are respectively inserted. It should be understood that when the motor outer shaft 3 rotates, the rotation of the motor outer shaft 3 is transferred to the outer blade shaft 20 through the outer motor joint 430, the outer sealing head 420, and the outer blade joint 410, and driving the outer blade shaft 20 to rotate. However, in the working process, the relative rotation between the outer motor joint 430, the outer sealing head 420, and the outer blade joint 410 needs to be prevented, the phenomenon that the outer blade shaft 20 cannot rotate stably can and be prevented. In the embodiments of the present disclosure, the outer motor joint 430 is provided with the second anti-rotation ribs 431, the outer sealing head 420 is provided with the second protective sleeve 423 fitted with the second anti-rotation ribs 431, the outer circumference of the outer blade joint 410 is provided with the second anti-rotation groove 411 fitted with the second protective sleeve 423, therefore, the connection between the motor outer shaft 3 and the outer blade shaft 20 can be better realized through cooperation between the second anti-rotation ribs 431, the second protective sleeve 423, and the second anti-rotation groove 411, and the phenomenon that the motor outer shaft 3 cannot rotate stably can be prevented.

It should additionally be noted that the predominant effect of the second anti-rotation ribs 431, the second protective sleeve 423, and the second anti-rotation groove 411 is the prevention of relative selection between the outer motor joint 430, the outer sealing head 420, and the outer blade joint 410. The specific shape, size, number of the second anti-rotation rib 431, the second protective sleeve 423, and the second anti-rotation groove 411 are not particularly limited herein, that is, the shape, size, and number of the second anti-rotation rib 431, the second protective sleeve 423, and the second anti-rotation groove 411 can be specifically selected according to actual conditions.

In some embodiments, as illustrated in FIGS. 4 to 5, the outer motor joint 430 has an outer central hole 432, and the inner motor joint 330 is inserted into the outer central hole 432. A radial gap between the outer motor joint 430 and the inner motor joint 330 is a, and a satisfies a≥1 mm. It should be understood that in the actual mounting process, the inner blade shaft 10 and the outer blade shaft 20 may be slightly eccentric, which may cause the phenomenon of uncoaxial rotation between the inner motor joint 330 and the outer motor joint 430 during the rotation of the inner blade shaft 10 and the outer blade shaft 20, so the radial gap between the outer motor joint 430 and the inner motor joint 330 is set within a range that is greater than or equal to 1 mm, the friction between the inner motor joint 330 and the outer motor joint 430 can be better avoided, and ensuring the lifetime of the inner motor joint 330 and the outer motor joint 430, and prolonging the lifetime of the blade assembly 1.

In some embodiments, an assembling clearance of the inner blade joint 310 and the inner sealing head 320 is less than 0.3 mm, and an assembling clearance of the outer blade joint 410 and the outer sealing head 420 is less than 0.3 mm. It should be understood that the co-axial rotation of the inner blade joint 310 and the inner sealing head 320 needs to be ensured, and the co-axial rotation of the outer blade joint 410 and the outer sealing head 420 also needs to be ensured. The assembling clearance between the inner blade joint 310 and the inner sealing head 320 is controlled to be less than 0.3 mm, and the assembling clearance between the outer blade joint 410 and the outer sealing head 420 is also controlled to be less than 0.3 mm, the coaxiality between the inner blade joint 310 and the inner sealing head 320, the outer blade joint 410 and the outer sealing head 420 can be better ensured, and ensuring that the motor inner shaft 2 can stably drive the inner blade shaft 10 to rotate, and the motor outer shaft 3 can stably drive the outer blade shaft 20 to rotate.

In some embodiments, the inner sealing head 320 and the outer sealing head 420 are made of elastic materials such as rubber and silicone, and and the sealing connection between the inner motor joint 330 and the inner blade joint 310, the outer motor joint 430 and the outer blade joint 410 can be better ensured.

Embodiment

A blade assembly 1 according to an embodiment of the present disclosure will be described below with reference to FIGS. 1 to 10.

The blade assembly 1 according to the present embodiment includes an inner blade shaft 10, an outer blade shaft 20, an inner joint assembly 30, an outer joint assembly 40, a blade sleeve 50, and a lock nut 60. The outer blade shaft 20 is fitted over the inner blade shaft 10, the blade sleeve 50 is fitted over the outer blade shaft 20, and the lock nut 60 is locked on the blade sleeve 50. A middle portion of the outer blade shaft 20 is provided with a positioning boss 220, two outer bearings 70a are arranged between the outer blade shaft 20 and the blade sleeve 50, and end faces of two outer bearings 70a respectively abut against two axial ends of the positioning boss 220. An upper portion and a lower portion of the outer blade shaft 20 are each provided with a mounting groove 210, and two inner bearings 70b are arranged between the outer blade shaft 20 and the inner blade shaft 10, the two inner bearings 70b are located in the mounting grooves 210 in the outer blade shaft 20 respectively. The upper end of the inner blade shaft 10 is connected with an inner blade 10a by a screw 80b, the upper end of the outer blade shaft 20 is provided with an outer blade 20a, and the outer blade 20a is located below the inner blade 10a. The outer blade 20a locks the outer blade 20a on the outer blade shaft 20 through a blade shaft nut 80a, an end of the blade shaft nut 80a toward the inner blade 10a is provided with a first oil seal 90a, and an end of the blade sleeve 50 toward the outer blade 20a is provided with a second seal 90b. The sealing effect between the inner blade shaft 10 and the outer blade shaft 20 is ensured through the first oil seal 90a, and the sealing effect between the blade sleeve 50 and the outer blade shaft 20 is ensured through the second oil seal 90b.

The inner joint assembly 30 includes an inner blade joint 310, an inner motor joint 330, and an inner sealing head 320. The inner sealing head 320 is connected between the inner blade joint 310 and the inner motor joint 330, the inner blade joint 310 is connected to the inner blade shaft 10, and an end of the inner blade shaft 10 is provided with a retaining ring 80d to realize the axial positioning of the inner blade shaft 10 relative to the inner blade joint 310. The inner motor joint 330 is adapted to be connected to the motor inner shaft 2. The outer joint assembly 40 includes an outer blade joint 410, an outer motor joint 430, and an outer sealing head 420. The outer sealing head 420 is connected between the outer blade joint 410 and the outer motor joint 430, the outer blade joint 410 is connected to the outer blade shaft 20 through set screws 80c, and the outer motor joint 430 is adapted to be connected to the motor outer shaft 3. The inner blade joint 310 is located at an inner side of the outer blade joint 410, and the inner motor joint 330 is located at an inner side of the outer motor joint 430; the inner motor joint 330 is located at an inner side of the inner sealing head 320, and the outer motor joint 430 is located at an inner side of the outer sealing head 420; the outer circumferential surface of the outer sealing head 420 is located at an outer side of the outer circumferential surface of the inner blade joint 310; an end face of the inner sealing head 320 and an end face of the outer sealing head 420 are staggered along the circumferential direction, and the inner sealing head 320 is arranged adjacent to the inner blade shaft 10.

The inner sealing head 320 is fitted over the inner motor joint 330, an end of the inner sealing head 320 toward the inner blade shaft 10 is the closed end, and an end of the inner blade joint 310 is fitted over the inner sealing head 320. The outer circumferential surface of the inner motor joint 330 is provided with the inner circumferential boss 331, and the open end of the inner sealing head 320 is formed with the inner wrapping protrusion 321 wrapped on the inner circumferential boss 331. The outer sealing head 420 is fitted on the end face of the outer motor joint 430 and has a central hole 424, and the outer sealing head 420 is provided with a first projecting ring 421 extending toward the inner blade shaft 10 along the central hole 424. The outer circumferential surface of the first projecting ring 421 is located at an inner side of the inner wrapping protrusion 321, and an upper end face of the first projecting ring 421 is located at an upper end of a lower end face of the inner wrapping protrusion 321. The outer circumferential edge of the outer sealing head 420 is provided with a second projecting ring 422 extending in a direction away from the inner blade shaft 10.

The outer circumference of the inner motor joint 330 is provided with first anti-rotation ribs 332 distributed along the circumferential direction, the inner sealing head 320 is provided with first protective sleeves 322 respectively fitted over the plurality of first anti-rotation ribs 332, and the inner circumference of the inner blade joint 310 is provided with first anti-rotation grooves into which the plurality of first protective sleeves 322 are respectively inserted. A mating surface between each first anti-rotation rib 332 and a corresponding first anti-rotation groove is a guiding surface S3, and the guiding surface S3 extends obliquely toward a rotation axis of the inner blade shaft 10 in a direction toward the inner blade shaft 10. The inner motor joint 330 also has an inner central hole 333, the end face of the inner sealing head 320 toward the inner motor joint 330 is provided with a plug 323 that can be inserted into the inner central hole 333.

The outer circumference of the outer motor joint 430 is provided with second anti-rotation ribs 431 distributed along the circumferential direction, the outer sealing head 420 is provided with second protective sleeves 423 respectively fitted over the plurality of second anti-rotation ribs 431, and the inner circumference of the outer blade joint 410 is provided with second anti-rotation grooves into which the plurality of second protective sleeves 423 are respectively inserted.

In the present embodiment, as illustrated in FIG. 4, the liquid flowing from the gap between the inner blade shaft 10 and the outer blade shaft 20 reaches the sealing end of the inner sealing head 320, and can then flow out via the outer surface of the inner sealing head 320, the outer surface of the outer sealing head 420 without entering the inner motor joint 330 or the outer motor joint 430, and avoiding the phenomenon of water entering the motor.

A food processor according to embodiments of the present disclosure includes the foregoing blade assembly 1.

In the food processor according to the embodiments of the present disclosure, since the blade assembly 1 described hereinbefore is included, the sealing between the blade assembly 1 and the motor can be better ensured, the possibility of water entering the motor can be reduced, the failure rate of machine can be reduced, and the user satisfaction can be increased.

In the description of the present specification, reference throughout this specification to "an embodiment," "some embodiments," "an exemplary embodiment", "an example," "a specific example," or "some examples" means that a particular feature, structure, material, or characteristic described in connection with the embodiment or example is included in at least one embodiment or example of the present disclosure. In the specification, the appearances of the above-mentioned terms are not necessarily referring to the same embodiment or example of the present disclosure. Furthermore, the particular features, structures, materials, or characteristics may be combined in any suitable manner in one or more embodiments or examples.

What is claimed is:

1. A blade assembly, comprising:
   an inner blade shaft;
   an outer blade shaft fitted over the inner blade shaft;
   an inner joint assembly comprising an inner blade joint, an inner motor joint, and an inner sealing head, the inner sealing head being connected between the inner blade joint and the inner motor joint, the inner blade joint being connected to the inner blade shaft, and the inner motor joint being adapted to be connected to a motor inner shaft; and
   an outer joint assembly comprising an outer blade joint, an outer motor joint, and an outer sealing head, the outer sealing head being connected between the outer blade joint and the outer motor joint, the outer blade joint being connected to the outer blade shaft, and the outer motor joint being adapted to be connected to a motor outer shaft;
   wherein the inner blade joint is located at an inner side of the outer blade joint, the inner motor joint is located at an inner side of the outer motor joint, an end face of the inner sealing head and an end face of the outer sealing head are staggered along an axial direction, and the inner sealing head is arranged adjacent to the inner blade shaft;
   wherein when the blade assembly is arranged in a vertical direction, the end face of the inner sealing head is located above the end face of the outer sealing head and defines a step between the inner sealing head and the outer sealing head.

2. The blade assembly according to claim 1, wherein the inner sealing head is fitted over the inner motor joint, an end of the inner sealing head toward the inner blade shaft is a closed end, and an end of the inner blade joint is fitted over the inner sealing head.

3. The blade assembly according to claim 2, wherein an outer circumferential surface of the inner motor joint is provided with an inner circumferential boss, and an open end of the inner sealing head is formed with an inner wrapping protrusion wrapped on the inner circumferential boss; and
   the outer sealing head is fitted on an end face of the outer motor joint and has a central hole, the outer sealing head is provided with a first projecting ring extending toward the inner blade shaft along the central hole, and an outer circumferential surface of the first projecting ring is located at an inner side of the inner wrapping protrusion.

4. The blade assembly according to claim 3, wherein an outer circumferential edge of the outer sealing head is provided with a second projecting ring extending in a direction away from the inner blade shaft.

5. The blade assembly according to claim 1, wherein an outer circumference of the inner motor joint is provided with a plurality of first anti-rotation ribs distributed along a circumferential direction, the inner sealing head is provided with a plurality of first protective sleeves respectively fitted over the plurality of first anti-rotation ribs, and an inner circumference of the inner blade joint is provided with a plurality of first anti-rotation grooves into which the plurality of first protective sleeves are respectively inserted.

6. The blade assembly according to claim 5, wherein a mating surface between each first anti-rotation rib and a corresponding first anti-rotation groove is a guiding surface, and the guiding surface extends obliquely toward a rotation axis of the inner blade shaft in a direction toward the inner blade shaft.

7. The blade assembly according to claim 1, wherein an outer circumference of the outer motor joint is provided with a plurality of second anti-rotation ribs distributed along a circumferential direction, the outer sealing head is provided with a plurality of second protective sleeves respectively fitted over the plurality of second anti-rotation ribs, and an inner circumference of the outer blade joint is provided with a plurality of second anti-rotation grooves into which the plurality of second protective sleeves are respectively inserted.

8. The blade assembly according to claim 1, wherein the outer motor joint has an outer central hole, the inner motor joint is inserted into the outer central hole, and a radial gap between the outer motor joint and the inner motor joint is a, a satisfies a≥1 mm.

9. The blade assembly according to claim 1, wherein an assembling clearance between the inner blade joint and the inner sealing head is less than 0.3 mm, and an assembling clearance between the outer blade joint and the outer sealing head is less than 0.3 mm.

10. The blade assembly according to claim 1, wherein an outer circumferential surface of the inner sealing head is located at an inner side of an outer circumferential surface of the outer sealing head.

11. The blade assembly according to claim 3, wherein there is a gap between an outer circumferential wall of the inner motor joint located below the inner circumferential boss and an outer circumferential wall of the inner sealing head.

12. The blade assembly according to claim 3, wherein an upper end face of the first projecting ring is located at an upper end of a lower end face of the inner wrapping protrusion, and a labyrinth seal is formed between the outer circumferential surface of the inner sealing head, the lower end face of the inner wrapping protrusion, the upper end face of the first projecting ring and the inner circumferential surface of the first projecting ring.

13. The blade assembly according to claim 1, wherein the inner motor joint has an inner central hole, and the end face of the inner sealing head toward the inner motor joint is provided with a plug inserted into the inner central hole.

14. The blade assembly according to claim 1, wherein the blade assembly further comprises a blade sleeve and a lock nut, wherein the blade sleeve is fitted over the outer blade shaft, and the lock nut is locked on the blade sleeve.

15. The blade assembly according to claim 14, wherein a middle portion of the outer blade shaft is provided with a positioning boss, two outer bearings are arranged between the outer blade shaft and the blade sleeve, end faces of two outer bearings respectively abut against two axial ends of the positioning boss, an upper portion and a lower portion of the outer blade shaft are each provided with a mounting groove, two inner bearings are arranged between the outer blade shaft and the inner blade shaft, and the two inner bearings are located in the mounting grooves in the outer blade shaft respectively.

16. The blade assembly according to claim 14, wherein the upper end of the inner blade shaft is connected with an inner blade by a screw, the upper end of the outer blade shaft is provided with an outer blade, and the outer blade is located below the inner blade.

17. The blade assembly according to claim 16, wherein the outer blade locks on the outer blade shaft through a blade shaft nut, an end of the blade shaft nut toward the inner blade is provided with a first oil seal, and an end of the blade sleeve toward the outer blade is provided with a second seal.

18. A food processor, comprising:
a blade assembly, comprising:
an inner blade shaft;
an outer blade shaft fitted over the inner blade shaft;
an inner joint assembly comprising an inner blade joint, an inner motor joint, and an inner sealing head, the inner sealing head being connected between the inner blade joint and the inner motor joint, the inner blade joint being connected to the inner blade shaft, and the inner motor joint being adapted to be connected to a motor inner shaft; and
an outer joint assembly comprising an outer blade joint, an outer motor joint, and an outer sealing head, the outer sealing head being connected between the outer blade joint and the outer motor joint, the outer blade joint being connected to the outer blade shaft, and the outer motor joint being adapted to be connected to a motor outer shaft;
wherein the inner blade joint is located at an inner side of the outer blade joint, the inner motor joint is located at an inner side of the outer motor joint, an end face of the inner sealing head and an end face of the outer sealing head are staggered along an axial direction, and the inner sealing head is arranged adjacent to the inner blade shaft;
wherein when the blade assembly is arranged in a vertical direction, the end face of the inner sealing head is located above the end face of the outer sealing head and defines a step between the inner sealing head and the outer sealing head.

* * * * *